(12) United States Patent
Haight

(10) Patent No.: US 10,851,934 B2
(45) Date of Patent: Dec. 1, 2020

(54) MOBILE PUMP HOUSE

(71) Applicant: WEIR CANADA, INC., Mississauga (CA)

(72) Inventor: Richard Haight, Mississauga (CA)

(73) Assignee: WEIR CANADA, INC., Mississauga (CA)

( * ) Notice: Subject to any disclaimer, the term of this patent is extended or adjusted under 35 U.S.C. 154(b) by 20 days.

(21) Appl. No.: 16/128,054

(22) Filed: Sep. 11, 2018

(65) Prior Publication Data

US 2019/0078724 A1 Mar. 14, 2019

Related U.S. Application Data

(60) Provisional application No. 62/556,819, filed on Sep. 11, 2017.

(51) Int. Cl.
| | |
|---|---|
| *F16M 1/04* | (2006.01) |
| *F04D 29/62* | (2006.01) |
| *F16M 3/00* | (2006.01) |
| *F04D 29/60* | (2006.01) |

(52) U.S. Cl.
CPC ............ *F16M 1/04* (2013.01); *F04D 29/605* (2013.01); *F04D 29/628* (2013.01); *F16M 3/00* (2013.01); *F05B 2240/90* (2013.01)

(58) Field of Classification Search
USPC ........................................................ 248/637
See application file for complete search history.

(56) References Cited

U.S. PATENT DOCUMENTS

| | | | | |
|---|---|---|---|---|
| 2,128,805 A | * | 8/1938 | Doran | F16M 5/00 248/637 |
| 2,797,897 A | * | 7/1957 | Persson | F23L 15/02 165/9 |
| 3,036,375 A | * | 5/1962 | Schlosser, Jr. | F16M 3/00 29/467 |
| 3,590,263 A | * | 6/1971 | Haug | F01D 25/28 290/42 |
| 3,658,438 A | * | 4/1972 | Coleman | F01D 25/28 415/213.1 |
| 3,799,482 A | * | 3/1974 | Bellati | F01D 25/28 384/428 |
| 4,081,163 A | * | 3/1978 | Guinn | E21B 3/045 173/165 |
| 6,520,124 B2 | * | 2/2003 | Bohm, II | F02B 63/04 123/2 |
| 6,874,756 B2 | * | 4/2005 | Hawkins | F15B 13/0817 137/553 |
| 7,028,970 B1 | * | 4/2006 | Wiseman | F16M 5/00 108/51.11 |
| 7,063,301 B2 | * | 6/2006 | Schauer | B23Q 1/01 220/571 |

(Continued)

*Primary Examiner* — Monica E Millner
(74) *Attorney, Agent, or Firm* — Perry + Currier

(57) ABSTRACT

A pump support assembly includes a skid having a top surface and a bottom surface configured to movably rest on the ground; and a frame for supporting a pump, the frame having a main body, and two wings extending from opposite sides of the main body substantially perpendicular to the main body, the frame supported on the top surface of the skid and connected to the skid at an end of one of the wings to isolate a pump support surface of the frame from deformations of the skid.

12 Claims, 4 Drawing Sheets

(56) References Cited

U.S. PATENT DOCUMENTS

| | | | | |
|---|---|---|---|---|
| 7,077,375 B1* | 7/2006 | McHugh | ............... | F16M 5/00 |
| | | | | 248/637 |
| 8,857,781 B2* | 10/2014 | Wang | ............... | F16M 1/00 |
| | | | | 248/678 |
| 9,581,175 B2* | 2/2017 | Nelson | ............... | F04D 29/605 |
| 9,937,444 B2* | 4/2018 | Vert | ............... | B63B 35/44 |
| 10,399,647 B2* | 9/2019 | Armstrong | ............... | F16L 3/18 |
| 2005/0214143 A1* | 9/2005 | Stirling | ............... | F04D 29/607 |
| | | | | 417/423.9 |
| 2009/0116984 A1* | 5/2009 | Ballu | ............... | F04D 15/00 |
| | | | | 417/423.3 |
| 2019/0063279 A1* | 2/2019 | Fontecchio | ............... | B01D 29/15 |

* cited by examiner

MOBILE PUMP HOUSE

BACKGROUND

Pumping installations, such as installations to extract water from bodies of fluid such as tailings ponds for mining, oil and gas operations, and the like, typically include one or more pumps disposed in the body of fluid. The fluid discharged from the pump(s), however, may be required to travel a substantial distance to downstream processing facilities. As a result, auxiliary pumping stations may be deployed between the above-mentioned pumps and the downstream facilities.

Auxiliary pumping stations, due to their size and weight, typically require ground preparation, such as the installation of a concrete pad to support the pump. In addition, auxiliary pumping stations may be required to relocate, for example in response to changing tailings pond geometry or process demands. The requirement for ground preparation may increase the cost and complexity of relocating the auxiliary pumping stations.

BRIEF DESCRIPTIONS OF THE DRAWINGS

Embodiments are described with reference to the following figures, in which.

DETAILED DESCRIPTION OF THE EMBODIMENTS

Figure 1:
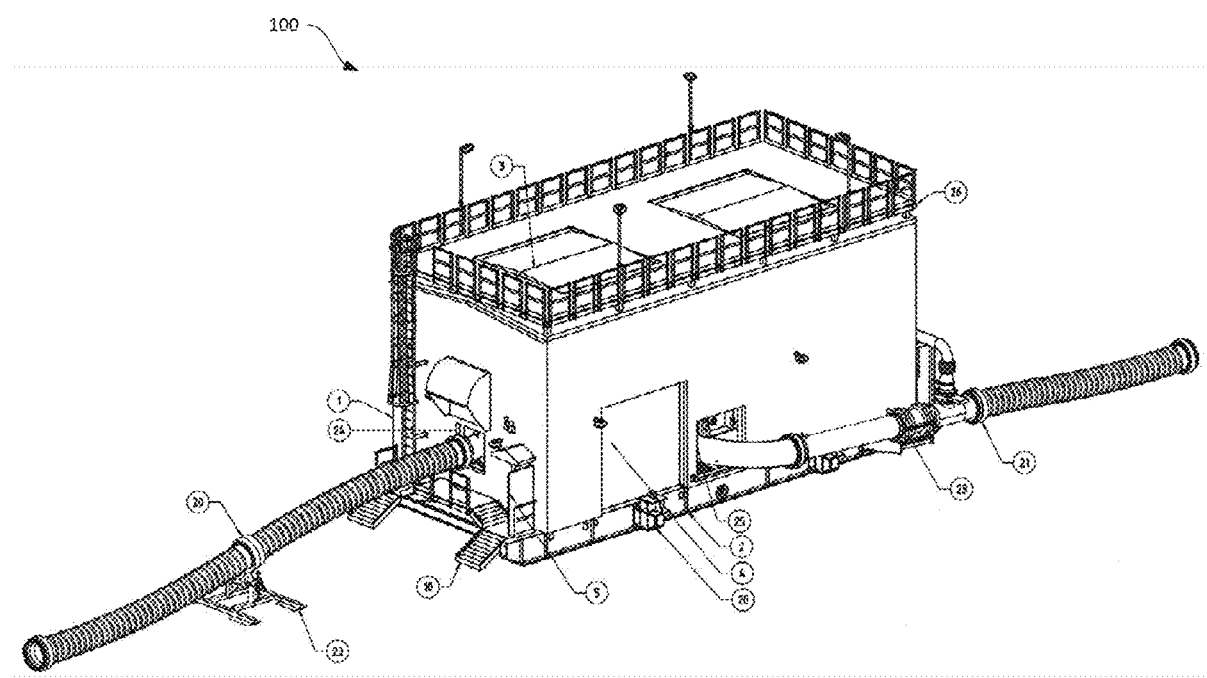
FIG. 1 depicts a mobile pump house, according to a non-limiting embodiment.

FIG. 1 depicts a mobile pump house 100, including a housing 1 supported on a skid 2. The skid 2 is configured to rest on a ground surface (not shown) and, as discussed in greater detail below, is movable on the ground surface. In the context of the discussion herein, the pump house 100 is therefore referred to as "mobile", although the pump house 100 is typically not moved during operation of the pump contained therein. The pump house 100, rather, may be relocated as discussed below via movement of the skid 2 along the ground surface under certain conditions. Further, the skid 2 is configured to rest directly on the ground surface, with minimal ground preparation (e.g. levelling), or no ground preparation.

The housing 1 includes housing walls (e.g., of corrugated metal or other suitable material), an access door 5 and a roll-up door 4 for allowing access to the interior of the housing 1. The pump house 100 houses a pump (not shown), supported on the skid 2. The walls of the housing 1 can include apertures 24 and 25 through which pipes 20 and 21 extend, for example carrying fluid to and from the pump (e.g., the pipe 20 can carry fluid to the pump house 100, while the pipe 21 can carry fluid away from the pump house 100 following discharge by the pump). The pipes 20 and 21 may be further supported by pipe supports 23. The housing 1 can also include a rooftop platform 26 and one or more roof access hatches 3. In other examples, the roof platform 26 is omitted and the hatches 3 are replaced with removable roof sections supported by the walls of the housing 1.

The skid 2 can include lugs 28 (which may be removable) for connection to equipment such as a bulldozer, jack, or crane for moving the skid 2. For example, the skid 2 may be dragged along the ground surface, or lifted and transported above the ground surface. In some examples, the skid 2 is lifted (e.g. by a crane) onto a trailer (such as a lowboy trailer) for transport, rather than dragged. The lugs 28 may be connected to skid 2 by bolts, rivets, welding or similar.

Figure 2:
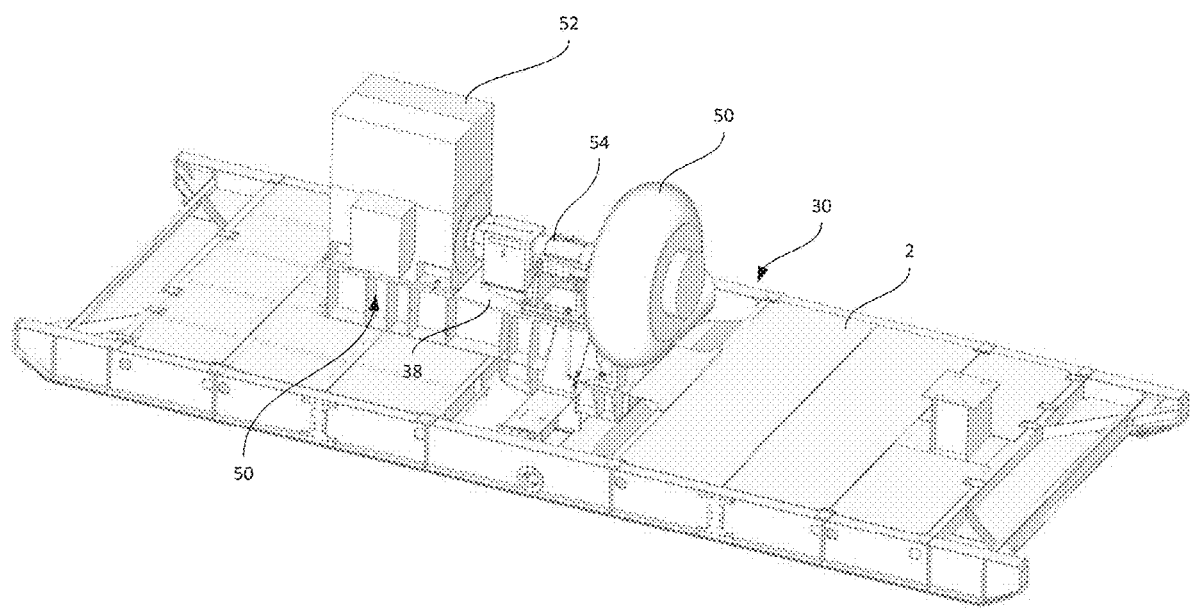
FIG. 2 depicts the mobile pump house of FIG. 1 with a housing thereof omitted, according to a non-limiting embodiment.

FIG. 2 illustrates the pump house 100 with the housing 1 and the pipes 20 and 21 omitted. In particular, FIG. 2 illustrates a pump support assembly 30 of the pump house 100. The pump support assembly 30 includes the skid 2 and a frame 32 for supporting a pump 50, which in the present example is a centrifugal pump driven by a motor 52 and a drive shaft 54. As will be apparent, the operation of the pump 50 may generate vibrations which, if undampened, may result in misalignment of the drive shaft 54. Such misalignment may contribute to undesirable wear or failure of the drive shaft 54, components of the pump 50, or both. The pump 50, motor 52 and drive shaft 54 are therefore supported on the frame 32 rather than directly on the skid 2. The frame 32, in turn, is supported on the skid 2 and connected to the skid 2 in such a manner as to substantially isolate a pump support surface 38 of the frame 32 (and therefore also isolate the pump 50 which rests on the surface 38) from deformations of the skid 2 as described below.

Figure 3:
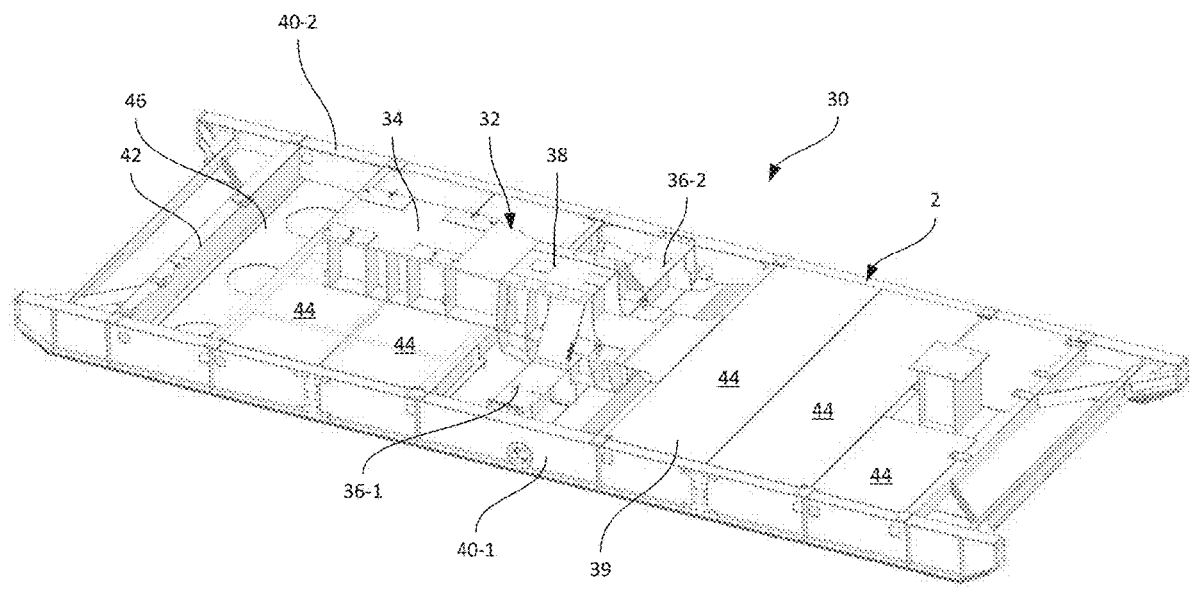
FIG. 3 depicts a pump support assembly of the mobile pump house of FIG. 1, according to a non-limiting embodiment.

FIG. 3 shows the pump support assembly 30 with the pump 50 omitted. The frame 32 includes a main body 34 and a pair of wings 36-1 and 36-2 extending from opposite sides of the main body 34. In the present example, the wings 36 extend substantially perpendicularly to the main body 34. The frame 32 is placed on an upper surface 39 of the skid 2. However, the frame 32 is not directly supported by the upper surface 40. Rather, the frame 32 is connected to the skid at a set of connection points selected to isolate the pump support surface 38 from deformations of the skid 2 (e.g., as the skid 2 settles into a ground surface following relocation). Such isolation reduces or prevents deformation of the pump support surface 38 itself.

The skid 2, in the present example, is constructed of longitudinal side beams 40-1 and 40-2 and a plurality of cross beams 42 extending between the longitudinal side beams 40. Additional structural elements (such as longitudinal beams, not shown, extending between adjacent cross beams 42) may also be included in other examples, if additional structural stability is required. The skid 2 includes a first set of panels or plates 44 defining the upper surface 39. One of the plates 44 is omitted in FIG. 3 to reveal one of a second set of panels or plates 46 which define a lower surface (not directly visible in FIG. 3) of the skid 2, which is configured to movably rest on the ground surface. As will be apparent, the ground surface may not be entirely level, and further may settle in certain locations under the weight of the pump house 1. The skid 2 may deform in response to such settling. As noted above, the structure of the frame 32 and the connections between the frame 32 and the skid 2 are selected to isolate the pump support surface 38 from deformations of the skid 2.

Figure 4:
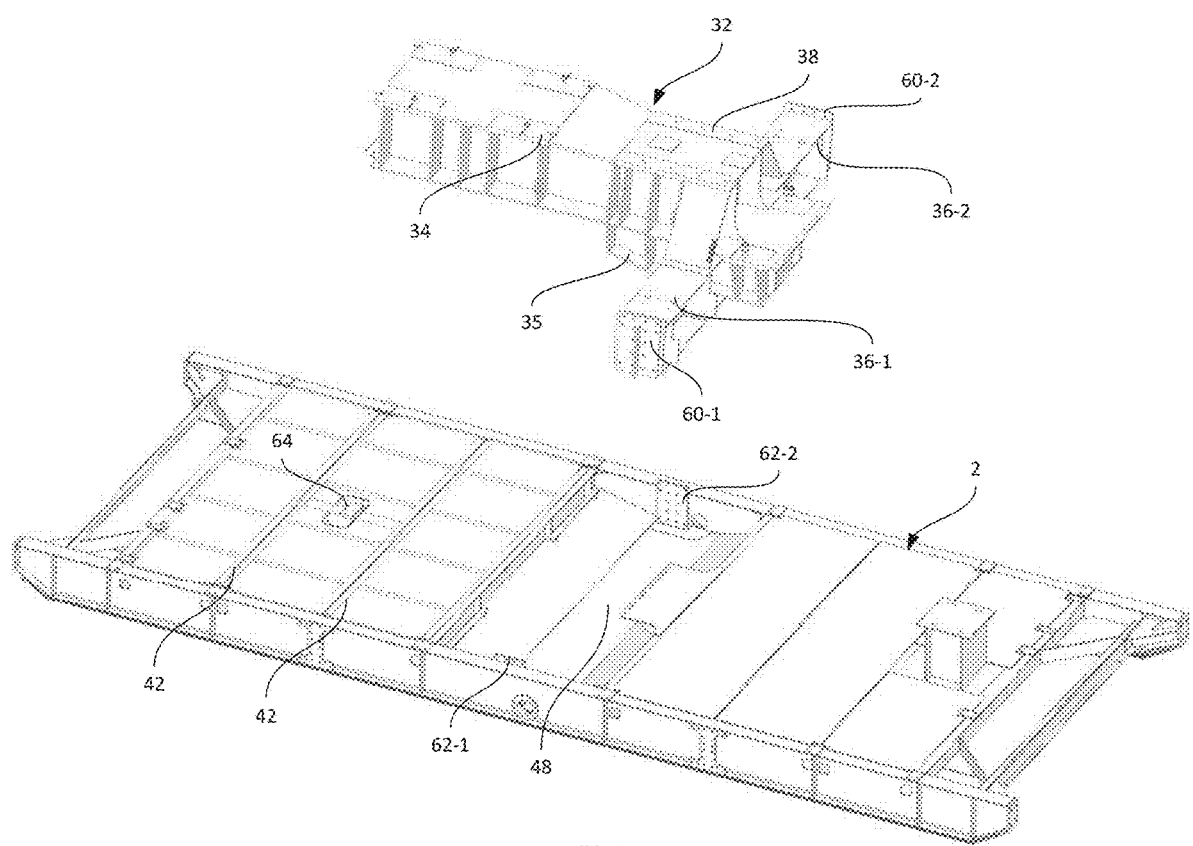
FIG. 4 depicts an exploded view of the pump support assembly of FIG. 3, according to a non-limiting embodiment.

Turning to FIG. 4, the frame 32 and the skid 2 are shown in an exploded view, with the frame 32 separated from the skid 2. The main body 34 and the wings 36 of the frame 32 are constructed so as to be substantially rigid, to resist deformation transmitted from the skid 2. For example, the frame 32 may be constructed to steel plates, I-beams with reinforced flanges, or the like.

The wings 36 each define a connection surface 60-1, 60-2 at or near the outer ends thereof, such as a plate having apertures therein for receiving fasteners such as bolts. The skid 2 defines corresponding connection surfaces 62-1, 62-2, such as plates affixed to the beams 40 and having complementary apertures. A third connection point between the frame 32 and the skid 2 is defined by an anchor 64, for example defined on an upper surface of an auxiliary longitudinal beam extending between adjacent cross beams 42. The frame 32 includes an anchoring surface 66 at the end of the main body 34 opposite the wings 36, which is configured to connect to the anchor 64.

Thus, the frame 32 connects to the skid 2 at the above-mentioned three points of connection. In other examples, the anchor 64 and anchoring surface 66 may be omitted, and the frame 32 may be connected to the skid 2 only at the ends of the wings 36. Although the frame 32 may rest on the upper surface 39 of the skid 2, the upper surface 39 may be permitted to shift relative to the frame 32 responsive to deformations of the skid 2. The wings 36 may serve to absorb torsional loads from the beams 40, preventing such loads from deforming the main body 34 and thus the pump support surface 38.

As also seen in FIG. 4, the main body 34 of the frame 32 includes a lower extension 35, extending the total height of the frame 32 below the portion of the pump support surface 38 that supports the pump 50 itself. The increased total height of the frame 32 resulting from the extension 35 serves to increase the rigidity of the frame 32. The wings 36 extend from either side of the lower extension 35. In addition, the skid 2 includes a depression 48 to accommodate the extension 35 and the wings 36 (as seen in the installed state in FIG. 3). The depression 48 is adapted to receive the lower extension 35 and the wings 36 of the frame 32.

In some embodiments, the pump house 100 can be accompanied by a movable electrical house (not shown), containing power supply components for the motor 52 of the pump 50. The electrical house can be based on a similar structure to that discussed above. That is, the electrical house may include a skid similar to the skid 2, and a housing similar to the housing 1. The electrical house may therefore also be movable along the ground surface. Typically the electrical house does not include an isolation component such as the frame 32. However, in some embodiments, components sensitive to deformation may be supported within the electrical house on a structure as described above in connection with the frame 32.

In operation, the pump house 100 is relocated via the engagement of moving equipment with the skid 2 (e.g. via the lugs 28). The skid 2 is then moved along the ground surface, or lifted and displaced over the ground surface, until the desired location is reached. Typically, one or more of the pump 50, the motor 52 and the drive shaft 54 are removed from the frame 32 prior to relocating the skid 2. For example, the pump 50, motor 52 and drive shaft 54 may be lifted along with the frame 32 itself. Alternatively, the frame 32 may be left installed during relocation of the pump house 100, while the pump 50, motor 52 and drive shaft 54 may be removed. In some embodiments, however, the pump 50, motor 52 and drive shaft 54 may be left in the pump house 100 during relocation.

The scope of the claims should not be limited by the embodiments set forth in the above examples, but should be given the broadest interpretation consistent with the description as a whole.

The invention claimed is:

1. A mobile pump support assembly comprising:
a skid having;
   a top surface and a bottom surface;
   two longitudinal side beams,
   a plurality of cross beams extending between the longitudinal side beams,
   a first set of plates connecting the two longitudinal side beams defining the top surface of the skid, and
   a second set of plates connecting the two longitudinal side beams defining the bottom surface of the skid; and
a frame for supporting a pump, the frame having a main body, and two wings extending from opposite sides of the main body substantially perpendicular to the main body, the frame supported on the top surface of the skid and connected to the skid at an end of one of the wings to isolate a pump support surface of the frame from deformations of the skid,
wherein the skid is configured to movably rest on the ground such that the pump support assembly may be relocated without disassembly of the skid and the frame.

2. The mobile pump support assembly of claim 1 wherein the frame is connected to the skid at a distal end of each of the wings.

3. The mobile pump support assembly of claim 1 wherein the wings extend from the main body near a first end of the main body.

4. The mobile pump support assembly of claim 3 wherein the frame is connected to the skid at a second end of the main body.

5. The mobile pump support assembly of claim 1 wherein the pump support surface of the frame is on top of the main body for supporting a pump such that a drive shaft of the pump is supported parallel to a length of the main body.

6. The mobile pump support assembly of claim 1 wherein the main body of the frame has a lower extension for providing additional support, the lower extension received in a depression formed by the top surface of the skid.

7. The mobile pump support assembly of claim 6 wherein the two wings extend from opposite sides of the lower extension, and the depression is adapted to receive the lower extension and the wings of the frame.

8. The mobile pump support assembly of claim 7 wherein the wings are connected to the longitudinal side beams of the skid.

9. The mobile pump support assembly of claim 1, further comprising lugs connected to the skid for lifting or moving the skid.

10. A mobile pump assembly comprising:
the mobile pump support assembly of claim 1; and
a pump motor coupled to a pump, the pump and pump motor supported on the pump support surface of the main body of the frame.

11. A mobile pump assembly comprising:
the mobile pump support assembly of claim 6; and
a pump motor coupled to a pump, the pump and pump motor supported on the pump support surface of the main body of the frame such that the pump is further supported by the lower extension of the frame.

12. A mobile pump assembly comprising:
the mobile pump support assembly of claim 1;
a pump supported on the pump support surface of the main body of the frame; and a housing having:
  walls supported by the skid,
  a door for allowing access to the interior of the housing, and
  apertures defined in the walls through which pipes may extend.

* * * * *